United States Patent [19]

Rasmussen

[11] 4,446,186
[45] May 1, 1984

[54] BUILDING ELEMENT

[75] Inventor: Lauritz B. L. Rasmussen, Lyngby, Denmark

[73] Assignee: Superfos Glasuld A/S (Superfos A/S), Vedbaek, Denmark

[21] Appl. No.: 454,162

[22] Filed: Dec. 29, 1982

Related U.S. Application Data

[62] Division of Ser. No. 212,512, Dec. 3, 1980, Pat. No. 4,372,799.

[30] Foreign Application Priority Data

Dec. 12, 1979 [DK] Denmark .............................. 5283/79

[51] Int. Cl.³ .......................... B32B 31/04; C09J 5/02
[52] U.S. Cl. ..............................: ...................... 428/74; 428/69; 428/76; 428/920
[58] Field of Search ...................... 428/69, 74, 76, 920, 428/346; 156/285, 293, 307.3, 319, 331.4

[56] References Cited

U.S. PATENT DOCUMENTS 2,020,639  11/1935  Grayson et al. ..................... 428/920
3,496,052   2/1970  Odenthal ............................. 156/285
4,092,202   5/1978  Bergk et al. ......................... 156/324

FOREIGN PATENT DOCUMENTS 2207581  6/1974  France .................................. 428/69

Primary Examiner—Paul J. Thibodeau
Attorney, Agent, or Firm—Stevens, Davis, Miller & Mosher

[57] ABSTRACT

In a building element of the type in which an internal core member of a material of an open air-permeable structure is covered on both side faces with cover boards and on the edge faces with edge strips, an adhesive bond having improved strength characteristics is obtained between the core member and the cover boards by means of a moisture-curing adhesive applied to the major surfaces of the core member and the internal surfaces of the cover board after application of moisture to all of said surfaces prior to arrangement of said core plate in an open casing formed by one of said cover boards and said edge strips, closing said casing by securing the remaining cover board to the edge strips and establishing a contact pressure between said surfaces by applying suction to the interior of the closed casing.

5 Claims, 2 Drawing Figures

BUILDING ELEMENT

This is a division of application Ser. No. 212,512 filed Dec. 3, 1980, now U.S. Pat. No. 4,372,799, issued Feb. 2, 1983.

BACKGROUND OF THE INVENTION

The invention relates to a method for use in the manufacture of a building element of the type comprising a plate-shaped internal core member of a material, particularly an insulating material, having an open air-permeable structure and relatively thin cover boards and edge strips of a harder material which is substantially impermeable to air covering said core member on the opposed side faces and all edge faces thereof, respectively.

From an article by Christian Strobech "Bonding Lightweight Insulated Sandwich Elements with Polyurethane Adhesives" in the periodical ADHESIVES AGES, vol. 20, June 1977, pages 23 to 28, a method is known in which the partial vacuum or underpressure necessary to press cover boards into contact with a core member having uncovered edge faces is obtained by using a vacuum pressing table of a construction known per se with a table-top on which said members are positioned in a sandwich arrangement in the prescribed order of succession upon a woven textile such as hessian, subsequent to application of adhesive to the cover boards. Thereafter, the sandwich structure is covered on the upper side with another piece of woven textile such as hessian, which is then covered by an air-impermeable plastic foil which is sealingly secured to the edges of the table top. Suction for providing the desired underpressure takes place through a number of stubs in the table top of the pressing table in the center line thereof. Thus, the flow path for the excavated air extends mainly through the uncovered edge faces of the core member and the woven material underneath the sandwich arrangement to said suction stubs.

In addition to the fact that vacuum pressing tables of this kind are relatively expensive per se, the operation thereof is complicated, so that exercise of the method described in the article requires considerable care and is relatively time-consuming, since the production of every single building element will require a number of operations. It appears also from the article that only 2 to 4 elements may be produced per pressing table within an eight-hour working day by the method described.

Since such a production capacity must be considered insufficient for industrial use, the article prescribes that in a more automatized production usual mechanical pressure application technology must be used.

However, particularly in the production of building elements of the kind mentioned in greater dimensions and with the use of recently developed, fast-curing adhesives, such as one-component polyurethane adhesives as suggested in the above mentioned article, it has appeared extremely difficult, when using mechanical pressure application technology, which for the production of elements of this kind is known inter alia from German patent specification No. 1,484,344, to obtain a sufficiently even pressure distribution during the curing of the adhesive and, thereby, an adhesive bond with sufficiently good strength characteristics. In addition, mechanical pressure application technology will require a considerable number of pressing stations on the same manner as the vacuum pressing technology suggested in the article, if a production capacity reasonable for industrial production is to be obtained.

SUMMARY OF THE INVENTION

It is the object of the invention to provide a method of the kind mentioned, in which a considerable simplification and cost-reduction of the production is obtained relative to the vacuum pressing technology known from the above mentioned article, while the advantages following from fast-curing adhesives are maintained to full extent, whereas considerably improved strength characteristics are obtained relative to known mechanical pressure application method in addition to a simplification and cost-reduction.

According to the invention, there is provided a method for use in the manufacture of a building element of the type comprising a plate-shaped internal core member of a material, particularly an insulating material, having an open air-permeable structure and relatively thin cover boards and edge strips of a harder material which is substantially impermeable to air covering said core member on the opposed side faces and all edge faces thereof, respectively, said method comprising the steps of assembling said edge strips and one of said cover boards to form an open casing, moistening the internal surfaces of said casing and one surface of the remaining cover board, applying a moisture-curing adhesive to said moistened surfaces, positioning said core member in said casing, assembling said casing with said remaining cover board with the adhesive applied to the moistened surface thereof facing said core member and pressing said cover boards into contact with said core member by applying suction through an opening in one of said edge strips, whereby to produce an underpressure in said core member.

Thus, the invention is based on the recognition of the fact that the cover boards and edge strips with which the building element is to be covered element by relatively simple assembling exerts a sufficient resistance to the passage of air and may, thereby, substitute the airtight plastic foil prescribed for covering purposes in the known vacuum pressing technology, as a result of which a special pressing table may be completely dispensed with.

As a result of the particular aspect of the method according to the invention that the amount of moisture necessary to promote the curing of adhesives of the kind mentioned are applied by moistening one side of the cover boards prior to the application of adhesive to the same side, there is secured an optimum benefit of the advantage following from the very short curing times of such adhesives, since in the subsequent suction, the moisture will be drawn into and through the overlying adhesive layer. Thereby, a considerable reduction of the processing time is obtained relative to the technique described in the above mentioned article, by which the amount of moisture is prescribed to be applied by moistening the core material, whereby there will be a tendency that the moisture will be removed by the suction without being able to influence the adhesive to any particular extent.

Moreover, according to the invention, there is provided a building element comprising a plate-shaped internal core member of a material, particularly an insulating material, having an open air-permeable structure and relatively thin cover boards and edge strips of a harder material which is substantially impermeable to air covering said core member on the opposed side faces and all edge faces thereof, respectively, said cover board being inseparably bonded to said core member by means of a moisture-curing adhesive, one of said edge strips having an opening for supplying suction to produce an underpressure in said core member, whereby to press said cover boards into contact with said member during curing of said adhesive.

BRIEF DESCRIPTION OF THE DRAWINGS

In the following, the invention will be explained in further detail with reference to the accompanying schematical drawing, in which.

DETAILED DESCRIPTION

Figure 1:
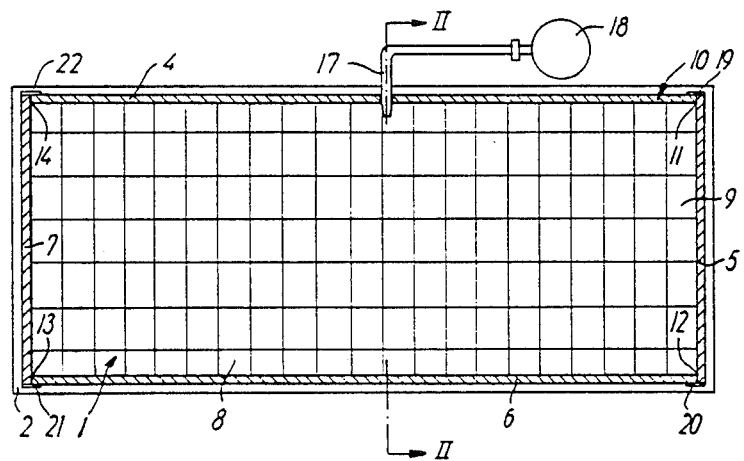
FIG. 1 illustrates the method according to the invention by a plane view of a building element with an internal core plate, from which one cover board has been removed and to which a suction device has been connected.

A building element of the kind with which the invention is concerned is composed of an internal core plate 1 of a material having an open air-permeable structure, said plate being covered on its major surfaces with cover boards 2 and 3, and on the edge faces with edge strips 4, 5, 6 and 7.

As shown in the drawing, a core plate is preferably used in the form of a form-stable strip insulation plate of the kind described in copending U.S. patent application Ser. No. 19,145 in the name of Kamstrup-Larsen et al. Such plates are preferably constructed from mineral wool strips 8, which have been turned with the fibre planes normal to the side faces of the plate and kept together by connecting means 9, such as strings or upstanding corrugated wall board strips, which are positioned and fixed into tracks extending perpendicular to the strips 8. However, according to the circumstances, also other types of core plates of such porous foam plastic materials, for instance, which are described in the above mentioned article, may be used in the method according to the invention.

The cover boards 2, 3 and the edge strips 4 to 7 consist preferably of veneer sheets of wood, such as plywood. However, depending on the field of application, also other materials, such as fibre glass reinforced plastic materials, or even metal plates, such as aluminium, may be used.

In the method according to the invention, an open casing 10 is first constructed from the edge strips 4 to 7 and one cover board 2, such as shown in FIG. 1, by gluing the edge strips 4 to 7 to the cover board 2 and to each other at their respective corner joints 11, 12, 13 and 14.

Subsequently, but prior to positioning of the core plate 1, moisture is supplied by means, for example, of a water atomizer, not shown, to the surfaces to be connected with the core plate 1, i.e. the surface of the cover board 2 facing the interior of the casing 10 and eventually the surfaces of the edge strips 4 to 7 facing the interior of the casing, and also of the corresponding side of the cover board 3 to be assembled with the casing 10 after positioning of the core plate 1.

Figure 2:
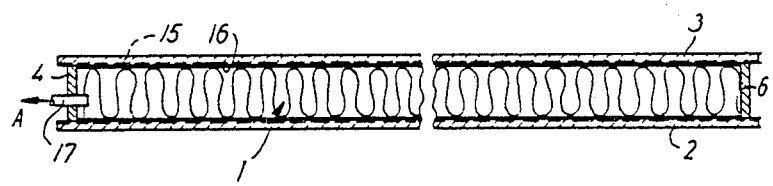
FIG. 2 is a cross-sectional view of the building element according to the line II—II in FIG. 1 with both cover boards in place.

Experiments have shown that with cover boards 2 and 3 of plywood, an amount of water of about 30 g/m$^2$ will be suitable for this moistening, which is schematically illustrated in FIG. 2 by means of a dashed line 15.

Thereafter, an adhesive 16 of the type curing quickly under the influence of moisture is applied to the moistened surfaces. As a suitable adhesive, a one-component polyurethane adhesive of the type developed in recent years may be used, said adhesive offering the benefit of a very short curing time without having the health-detrimental secondary effects which may occur with other hitherto employed adhesives of the epoxy type, for example.

Experiments have shown that with a core plate 1 in the form of a form-stable mineral wool strip plate and cover boards 2, 3 of plywood, application of an amount of adhesive of about 300 g/m$^2$ on the surfaces mentioned will be suitable.

Subsequent to the application of adhesive, the core plate 1 is positioned in the casing 10, shown in FIG. 1, and the cover board 3 is secured to the edges of the four edge strips 4 to 7 by means of nails, for example.

Thereafter, in a suitable opening 16 which has been formed in advance in one edge strip 4, there is now inserted a suction stub 17, shown purely schematically, which is connected with a suction device 18. As illustrated, the free end of the suction stub 17 should preferably project some distance into the material in the core plate 1.

The suction device 18 may be constituted, for example, by an electrically driven vacuum pump of a construction known per se and having a capacity sufficient to provide an underpressure in the core plate 1 corresponding to the necessary contact pressure, which for adhesive bonds of the type described will amount to 0.03 to 0.05 kps/cm$^2$. Practical experiments have shown that an underpressure of the order of magnitude of 50 to 60 mbar will be suitable. In FIG. 2, the suction is indicated by an arrow A.

Moreover, experiments have shown that by means of only a single suction stub, such as shown at 17, a surprisingly even pressure distribution will be obtained in the interior of the core plate 1 with a maximum pressure difference of only 20 percent between the underpressure values close to the mouth of the stub 17 and in the parts of the core plate 1 remote therefrom, even in the case of relatively great elements having a surface area of, for example, 120×240 cms. In addition, it has appeared that this even pressure distribution is not influenced to any noticeable extent by the small leakages which may occur in the joints between the cover boards 2, 3 and the edge strips 4 to 7, particularly at the corner joints 11 to 14. On the other hand, such leakages may put increased demands upon the pumping capacity of the suction device 18, and with a view to this it might be advantageous to use a suitable sealing of the corner joints 11 to 14 by using tape strips 19, 20, 21 and 22, for example, such as shown in FIG. 1.

In the experiments conducted, initial foaming of the adhesive was observed along the joints between the edge strips and the cover boards immediately subsequent to assembling of the element and the application of suction and a simultaneously increasing underpressure in the interior of the core plate, the latter resulting presumably from the sealing effect per se of the foaming of the adhesive. The total duration of the foaming (opening time) and the curing of the adhesive has appeared to be less than 30 minutes.

Subsequent control of the adhesive bonds in respect of quantity as well as quality has shown extremely good characteristics with a very effective foaming acting to balance tolerances in the core plates and a good adhesion.

For the industrial production of building elements of the kind mentioned, the method according to the invention offers the particular advantage that as a result of the direct suction through an opening in an edge strip, several elements may be processed in one time by a single suitably dimensioned suction device, to which a corresponding number of suction stubs are connected through a distribution arrangement which may be provided with individually adjustable valves. The elements may be stacked, for example, in batches of six overlying each other, whereby also considerations in respect of transportation are met. With a suction device having twelve suction stubs for processing two such stacks of elements at one time, it will be possible without difficulty with the processing time indicated above to achieve a production capacity of twelve elements per hour.

In addition, relative to the mechanical pressure application technology which has hitherto been employed in the production of the elements in question, the method offers an advantageous flexibility in respect of independence of the geometrical design and the dimensions of the elements together with the particular advantage from a point of view of environment protection that poisonous fumes arising during the curing of the adhesive are directly removed by suction.

I claim:

1. A building element comprising a pair of opposed air impermeable cover boards forming opposite major surfaces of the element, air impermeable edge strips separating and connecting said cover boards and constituting the side and end edges of the element, and a heat insulating core member positioned in the interior of the element, said insulating member being formed as a substantially rigid, formstable core plate of an insulating material having an air permeable internal structure and a size and shape so as to occupy substantially all of the space within the element, both major surfaces of said core plate being inseparably bonded to said cover boards by means of a moisture curing adhesive applied to said major surfaces and the internal surfaces of the cover board and by means of a partial vacuum established in the core plate to effect pressing of the cover boards onto said core plate during curing of the adhesive, said vacuum being achieved by means of applied suction through an opening located in the closed casing.

2. The element of claim 1 in which the insulating material is mineral wool.

3. The element of claim 1 in which the fibers of the insulating material extend substantially perpendicular to the cover boards.

4. The elements of claim 1 in which the interior is free of intermediate supporting structures.

5. The element of claim 1 in which the major surfaces of the core plate are bonded over substantially all of their area in contact with said cover boards.

* * * * *